July 3, 1951
H. S. ZAHNER ET AL
2,559,554
KITCHEN POTATO DICER
Filed May 19, 1947
2 Sheets-Sheet 2
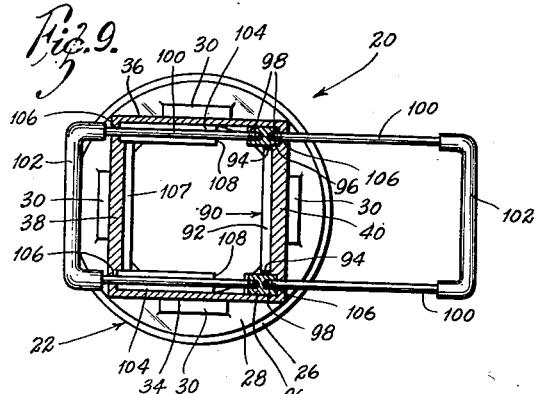
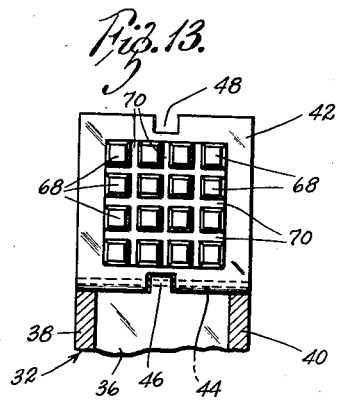
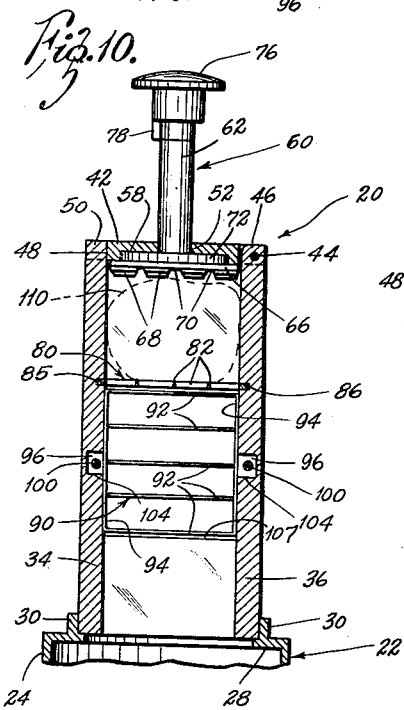
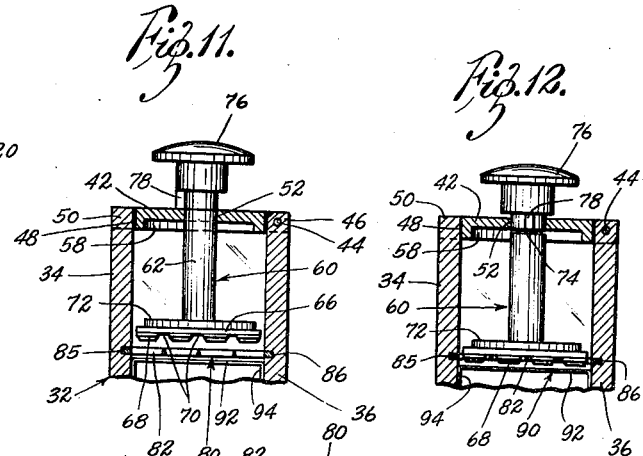
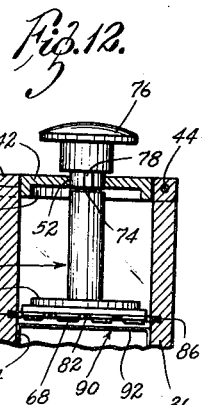
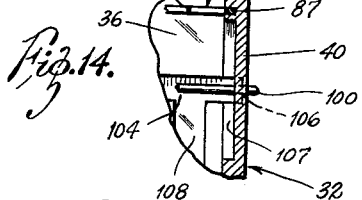
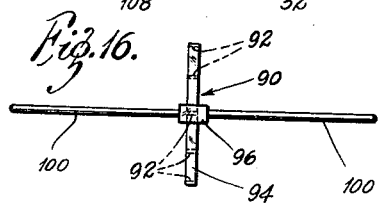
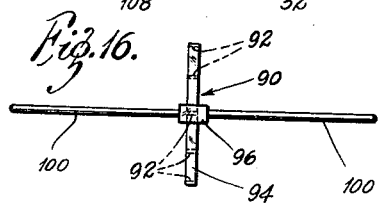
INVENTORS:
HUBERT S. ZAHNER,
WILLIAM S. NASH,
BY Kingsland, Rogers & Ezell
ATTORNEYS.

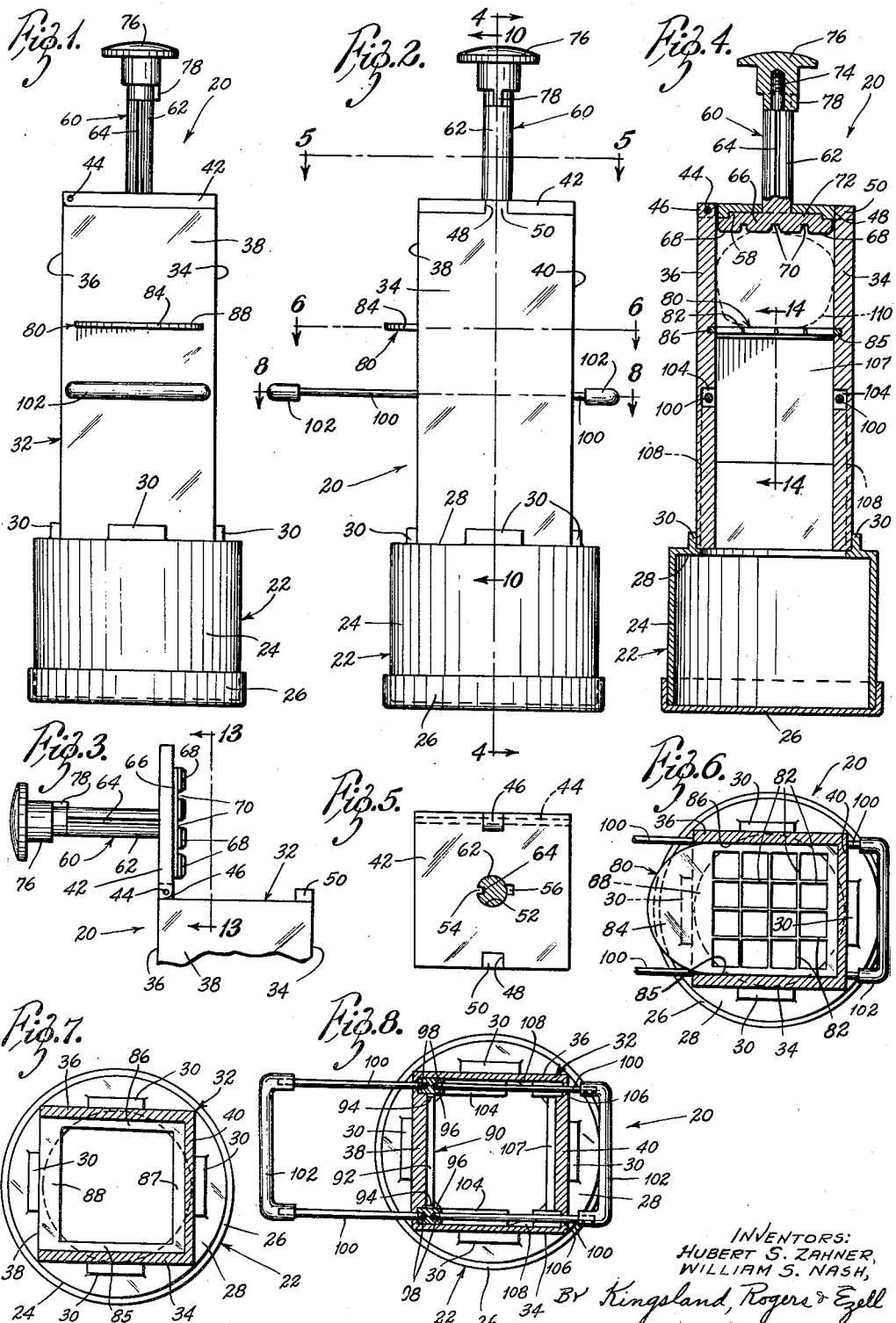

Patented July 3, 1951

2,559,554

UNITED STATES PATENT OFFICE 2,559,554

KITCHEN POTATO DICER

Hubert S. Zahner, St. Louis, and William S. Nash, Overland, Mo.

Application May 19, 1947, Serial No. 748,876

2 Claims. (Cl. 146—78)

The present invention relates generally to kitchen utensils, and more particularly to a device for selectively slicing or dicing vegetables.

An object of the present invention is to provide a novel vegetable slicer-dicer device which is compact in construction and by which vegetables may be selectively sliced or diced in a rapid and efficient manner.

Another object is to provide a novel vegetable slicer-dicer device in which the several cutting elements may be readily dismantled for cleaning and for facilitating the cleaning of the casing of the device.

Other objects are to provide a novel vegetable slicer-dicer device which is inexpensive, which is simple in construction and easy to use, which may be readily stored in a small space due to its compact form, which is designed to receive vegetables and other foods of various sizes and shapes, and which can be used selectively as a slicer or dicer.

The foregoing and other objects and advantages are apparent from the following description taken with the accompanying drawings, in which:

Fig. 1 is a side elevational view of a slicer-dicer device constructed in accordance with the concepts of the present invention shown mounted on a specially designed food-receiving receptacle;

Fig. 2 is a side elevational view of the device shown in Fig. 1 at 90° thereto;

Fig. 3 is a fragmentary side elevational view of the top portion, showing the top and associated pusher member in open positions;

Fig. 4 is a vertical central cross-sectional view on the line 4—4 of Fig. 2;

Fig. 5 is a horizontal cross-sectional view on the line 5—5 of Fig. 2;

Fig. 6 is a horizontal cross-sectional view on the line 6—6 of Fig. 2, a portion of the operating handle of the dicer blades being broken away for conservation of space;

Fig. 7 is a horizontal cross-sectional view on the line 6—6 of Fig. 2, the slicer and dicer knives being removed;

Fig. 8 is a horizontal cross-sectional view on the line 8—8 of Fig. 2, showing the dicer knife in one extreme position;

Fig. 9 is a horizontal cross-sectional view on the line 8—8 of Fig. 2, showing the dicer knife in its other extreme position of movement;

Fig. 10 is a vertical central cross-sectional view on the line 10—10 of Fig. 2;

Fig. 11 is a fragmentary vertical cross-sectional view on a portion of the line 10—10 of Fig. 2, showing the pusher member in its limited lower position;

Fig. 12 is a view similar to Fig. 11, showing the pusher member in its lowermost position;

Fig. 13 is a vertical sectional view on the line 13—13 of Fig. 3;

Fig. 14 is a fragmentary vertical cross-sectional view on the line 14—14 of Fig. 4;

Fig. 15 is a plan view of the slicer knife; and

Fig. 16 is a side elevational view of the dicer knife, less the connecting cross member.

Referring to the drawings more particularly by reference numerals, 20 indicates generally a slicer-dicer device constructed in accordance with the teachings of the present invention. The slicer-dicer device 20 is shown in the drawings as removably mounted on a food-receiving receptacle 22 which includes a cylindrical body 24, a removable frictionally held bottom 26, an inwardly directed horizontal flange 28, and spaced lugs 30.

The device 20 includes a body or casing 32, shown as of square cross section and including a front wall 34, a rear wall 36, and side walls 38 and 40. Manifestly, the body 32 may be of cylindrical, octagonal, or other selected cross section. A cover 42 is pivoted on a pin 44 extending through a vertical post 46 formed integral with the rear wall 36. The cover 42 is of square configuration and includes a slot 48 which snugly fits a vertical post 50 formed integral with the front wall 34 when the cover 42 is in closed position (Figs. 2 and 4). Centrally of the cover is a circular opening 52 having a key 54 extending radially thereinto. Communicating with the circular opening 52 is a slot 56. In its underside, the cover 42 includes an annular recess 58.

A pusher member 60 is mounted in the cover 42 for reciprocation and includes a stem 62 slidingly located in the opening 52. The stem 62 has a longitudinal keyway 64 which receives the key 54. At one end of the stem 62 is a square pusher plate 66, the pushing surface of which is of grid formation including a plurality of spaced square islands 68 which are separated by right angularly crossing grooves 70 (Figs. 4 and 13). The pusher plate 66 includes a reduced circular portion 72 (Fig. 11) which fits into the recess 58 of the cover 42. At the other end of the stem 62 is a threaded reduced portion 74 which threadedly receives a pusher button 76. The pusher button 76 has a depending lug 78 formed integral with the hub thereof, which, in one rotated position of the button 76, is received by the recess 56 (Figs. 5, 11 and 12) for a purpose described below.

A removable slicer knife 80 (Fig. 15) is provided which includes vertically disposed blades 82 formed as a grid, and a finger portion 84. The slicer knife 80 normally rests in horizontal grooves 85, 86 and 87 and a horizontal slot 88 formed in the walls 34, 36, 40 and 38, respectively (Figs. 6 and 7). The depth of the grooves 85, 86 and 87 is substantially equal to the width of the supporting margins around the blades 82 so that no obstruction is in the way of vegetables being sliced, as is clear from Fig. 4. The knife 80 may be constructed to form a closer knit grid and for ricer purposes. For vegetable mashing purposes, a closely apertured plate may replace the knife 80.

Beneath the slicer knife 80 is a dicer knife 90 (Figs. 8 and 16) which is also removable. The dicer knife 90 includes five vertically spaced horizontal two-edge knife blades 92 (Fig. 10) which are connected by end members 94. Each end member 94 is secured to a rectangular member 96 which includes threaded wells 98 extending into opposite ends thereof. A small rod 100 threadedly engages each well 98, each pair of rods 100 at each side of the members 96 frictionally receiving a connecting cross member 102, which serve as handles for manipulating the slicer knife 90.

As is clear from Figs. 8-10, the members 96 ride in horizontal grooves 104 formed in the walls 34 and 36. The rods 100 have bearing support at the ends of the grooves 104 in apertures 106 formed through the walls 38 and 40. A recess 107 is provided in each of the walls 38 and 40 of a depth to receive the blades 92 when not in operation (Figs. 8 and 14). Vertical grooves 108 in the walls 34 and 36 form means for removal of the knife blades 92, receiving the members 96.

It is to be noted that the dicer knife 90 may be located above the slicer knife 80 in some devices.

Operation

With the device 20 assembled as shown in the drawings, to use it for slicing or dicing, the pusher member 60 is raised to the position shown in Fig. 4, and the cover 42 with the pusher member thus raised is pivoted to the position shown in Fig. 3, the post 46 acting as a stop. A potato 110, or the like, is placed in the body 32 on the top of the slicer knife 80. The cover 42 and pusher member 60 are returned to the positions shown in Fig. 4. Downward pressure is applied to the pusher button 76, which pressure is transmitted to the pusher plate 66. The potato 110 is forced through the slicer knife 80, thereby effecting a plurality of elongated slices of potato of square cross section. The pusher plate 66 does not engage the slicer knife 80 but is spaced therefrom, as is shown in Fig. 11, by the lug 78 of the pusher button 76 striking the top surface of the cover 42. Hence, the elongated slices of potato are held by the slicer knife 80. If it is desired to dice the potato, the dicer knife 90 is moved from its position of rest, as is shown in Fig. 8, transversely through the depending slices of potato to its position shown in Fig. 9, thereby cutting the slices into cubes. If only a single potato, or other vegetable, is being diced, the pusher button 76 is rotated to a position for the lug 78 to register with the slot 56 (Fig. 12). Thereupon, the pusher button 76 is pushed downwardly to bring the islands 68 of the pusher plate 66 into registry with the grid of the slicer knife 80, which ejects that portion of the potato previously held by the slicer knife 80. If other vegetables are being diced, it is unnecessary to perform this operation until the last item is diced, since the succeeding potato or other vegetable will perform the same function of ejecting the retained cubes. It is to be noted that the dicer knife 90 cuts in both directions of movement, expediting the dicing process.

It is manifest that the sliced or diced vegetables are caught by the container 22, which may serve as a measuring cup. The bottom 26 is readily removable for removing vegetables caught thereby.

The device 20 is sanitary since the slicer knife 80 and the dicer knife 90 may be removed for cleaning. The slicer knife 80 is readily removed from its position shown in Fig. 6 by grasping the finger portion 84 and pulling it out. The dicer knife 90 requires dismantling, but the procedure is simple and can be quickly performed. The connecting members 102 are frictionally engaged on the ends of the small rods 100 and can be readily removed by pulling. Thereafterwards, the rods 100 may be unscrewed from the members 96 and removed. The knives 92 are then free to be slipped downwardly in the grooves 108 (Figure 14). The whole dismantling procedure takes only a fraction of a minute. To replace the slicer knife 80 and the dicer knife 90, the foregoing procedures are simply reversed. It is manifest that, with the knives removed from the casing 32, the interior thereof may be readily easily cleaned.

It is apparent that there has been provided a kitchen utensil which fulfills all the objects and advantages sought therefor.

It is to be understood that the foregoing description and the accompanying drawings have been given by way of illustration and example. It is also to be understood that changes in form of the several parts, substitution of equivalent elements, and rearrangement of parts, which will be readily apparent to one skilled in the art, are contemplated as within the scope of the present invention, which is limited only by the claims which follow.

What is claimed is:

1. A kitchen utensil comprising a casing, a vegetable slicing knife and a reciprocable dicing knife removably mounted in said casing, said dicing knife including a pair of blade supporting members, said casing having a pair of opposed horizontal grooves formed in the walls therefor for receiving said blade supporting members for reciprocation therein, means for reciprocating the blade supporting members in the grooves, said casing also having a pair of opposed vertical grooves formed in the walls therefor providing ways for receiving said blade supporting members during the removal and insertion of the dicing knife blades.

2. A kitchen utensil, comprising a vertically disposed tubular casing including a pair of opposed side walls; a dicing knife disposed within the casing including a plurality of spaced cutting blades and a pair of blade supporting members; horizontal grooves in the opposed side walls to slidably receive the blade supporting members whereby the blades and blade supporting members can be reciprocated crosswise of the casing; means detachably fastened to the blade supporting members for reciprocating them in said grooves; and vertically extending channels in the opposed walls intersecting the grooves through which the blades and blade supporting members can be removed from the casing as a unit when the reciprocating means are detached therefrom.

HUBERT S. ZAHNER.
WILLIAM S. NASH.

REFERENCES CITED

The following references are of record in the file of this patent:

UNITED STATES PATENTS

| Number | Name | Date |
|---|---|---|
| 57,111 | Forschner | Aug. 14, 1866 |
| 1,046,551 | Cass | Dec. 10, 1912 |
| 1,094,604 | Shibata | Apr. 28, 1914 |
| 1,512,644 | Smith | Oct. 21, 1924 |
| 1,808,933 | Pahlow | June 9, 1931 |
| 2,437,818 | Hetzler | Mar. 16, 1948 |

FOREIGN PATENTS

| Number | Country | Date |
|---|---|---|
| 344,416 | Germany | Nov. 22, 1921 |
| 387,186 | Germany | Dec. 22, 1923 |